United States Patent Office 3,182,524
Patented May 11, 1965

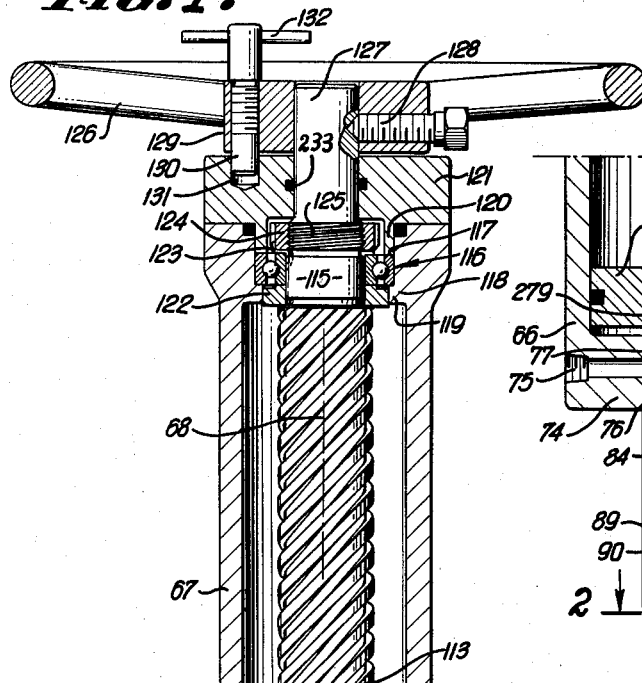
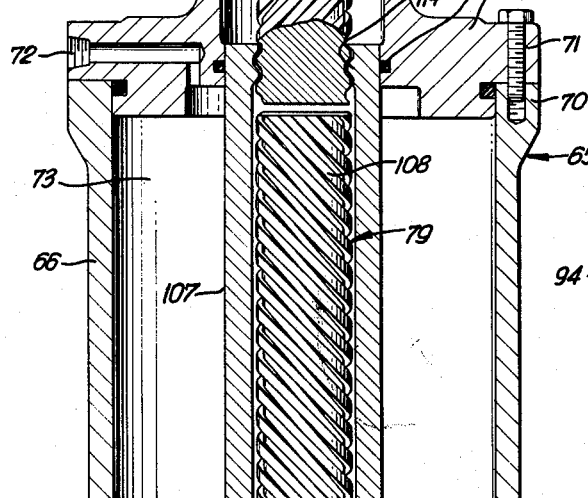
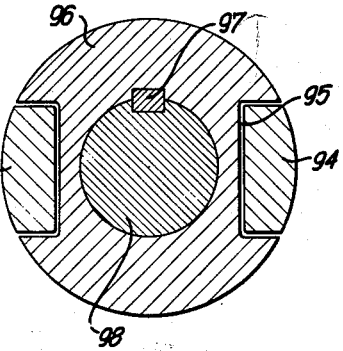

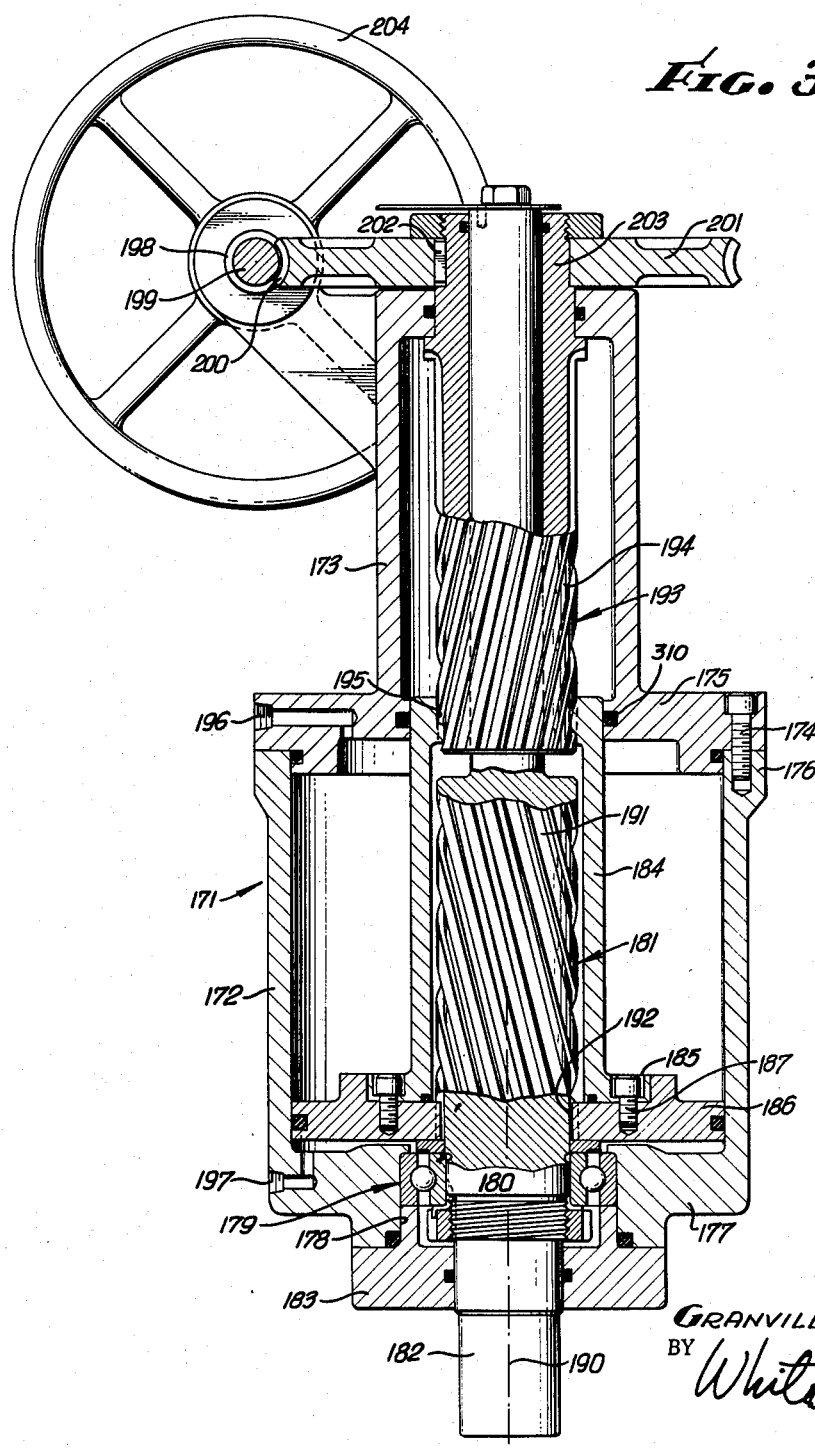

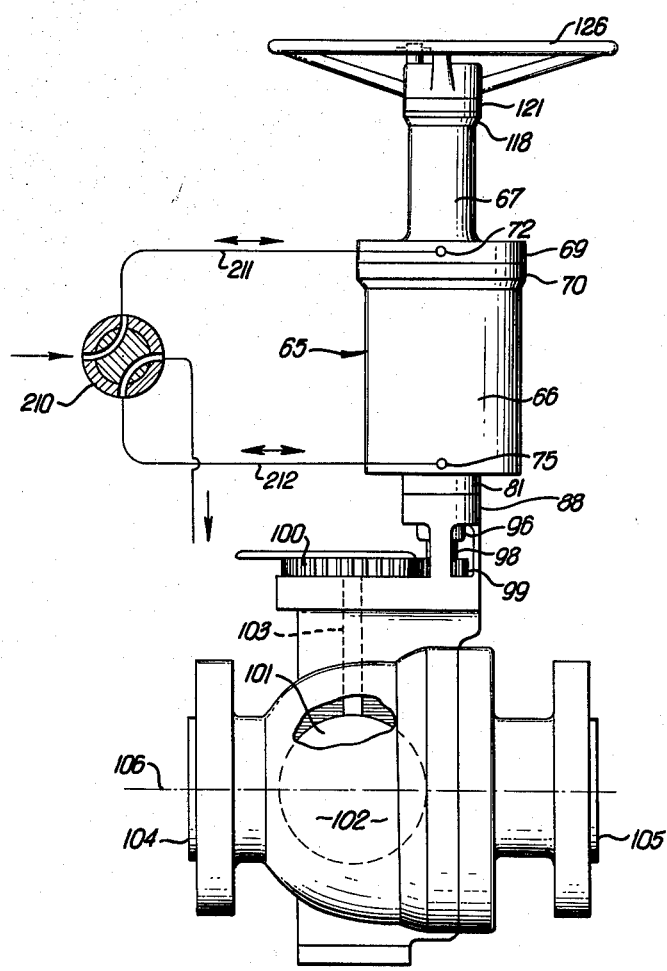

3,182,524
VALVE OPERATOR
Granville S. Knox, La Canada, Calif., assignor to Hydril
Company, Los Angeles, Calif., a corporation of Ohio
Filed Feb. 17, 1964, Ser. No. 346,380
2 Claims. (Cl. 74—625)

This invention relates generally to operator apparatus for turning rotary equipment, and more particularly concerns novel operator apparatus characterized as especially applicable to heavy flow control equipment such as valves and the like. This application is a continuation-in-part of my prior application "Valve Operator" Serial No. 84,339, filed January 23, 1961, now abandoned.

It is well known that fluid flowing through a partially open rotary valve stopper in a flow line produces kinetic energy which makes itself known in the form of torque acting to close the valve stopper. This effect increases with the size of the flow line and the valve, and is also more pronounced with higher fluid flow velocities and fluid densities. In particular, it becomes extremely difficult to open, and to resist closing tendencies of large valve stoppers controlling the flow of water through pipes of the sizes commonly in use in association with dams, and in metropolitan water supply lines, which lines may have representative diameters between 24 and 36 inches.

Hydraulic or pneumatic valve operators in common use for controlling such valves are necessarily bulky and expensive considering their design. They may be characterized generally as including rack and pinion type gearing having only a few teeth in interengagement at any given time and which must necessarily be of sufficient size and section as to transmit and overcome, without failure, the full reaction load exerted on the valve stopper by the flowing water. Considering what has been said, it is a general object of the present invention to provide novel operator apparatus having significantly reduced size and weight involving substantially diminished expense of manufacture, all as compared with existing valve operator apparatus of which I am aware.

The above mentioned general object is carried out in according with the invention through the provision of a novel rotary operator assembly comprising a housing having stepped cylindrical bore portions extending coaxially longitudinally, fluid pressure responsive and axially reciprocable driver means having externally stepped cylindrical head and stem sections which are respectively received by and have slidable sealing relationship with the bore portions. The driver means is generally tubular and has longitudinally spaced sets of internal splines, and the assembly includes rotary shaft means journaled for rotation within the housing and having external splines engaging one set of the driver internal splines. In addition, the assembly includes torque means sealing with the housing and carried to extend within the driver means, and also having external splines engaging another set of the driver internal splines. Further, means is provided for locking the torque means against rotation so that axial reciprocation of the driver will result in rotation of the shaft means; and finally, the housing and driver form a pair of chambers alternately to receive actuating fluid pressure at opposite sides of the head section, one of the chambers being in direct communication with the external splines of the shaft means and torque means to receive lubricating fluid exhausted from a space defined by the torque means, splines and one of the cylindrical bore portions as the driver moves to expand said one chamber. Typically, a flow passage interconnects opposite ends of the driver and a portion of the actuating fluid is displaced through the flow passage and in lubricating proximity with the external and internal splines when the driver is reciprocated. The locking means may also be releasable, with manually operable means provided for rotating the torque means, driver and shaft means as a unit when the driver is held in a longitudinally fixed position within the housing.

Distinct advantages flowing from this structure functioning in the manner described, and to be described in greater detail, include the ready adaptation and use on the basic rotary means, driver means and torque means of coaxial and helical coupling shoulders characterized in that the loading is well distributed over a greater area, so as to lower the stresses to which the shoulders and parts are subjected, thereby enabling significant reductions in size of the operator apparatus. Also, the confinement of movement of the basic assembly parts to coaxial rotation and relative longitudinal displacement permits a novel telescopic arrangement which again contributes to size and weight reduction. Further, the pressure fluid may itself be used in a novel and unusual manner to pass in lubricating proximity to the helical splines when the driver is reciprocated, the splines having exterior configuration on both the driver and shaft means for ease of fabrication.

Other objects of the invention include the incorporation in a fluid pressure activated rotary valve operator of a self locking drive capable of resisting valve closing torque resulting from pressure exertion by the flow against the valve stopper, the self locking drive itself being capable of maintaining the stopper in partly open or throttling position, eliminating need for other or auxiliary locking devices.

Another object is to provide an hydraulically or pneumatically powered rotary valve operator which will also permit easy manual rotation of the valve stopper in either rotary direction, even though fluid pressure application to the operator may be tending to hold the stopper against rotation or even tending to rotate the stopper in a direction opposite that producible by manual operation.

These and other objects and advantages of the invention, as well as several illustrative embodiments, will be more fully understood from the following detailed description of the drawings, in which:

FIGS. 1 and 1a show a modified form of operator apparatus in vertical section, partly broken away;

FIG. 2 is a view taken on line 1—1 of FIG. 1a;

FIG. 3 is a vertical section, partly broken away, showing another form of operator apparatus; and FIG. 4 is an exterior elevation showing the FIG. 1 apparatus in combination with a rotary type plug valve.

Referring to FIGS. 1 and 2, and also to FIG. 4, the operator is shown to include a chamber 65 which comprises a cylinder 66 and a cap 67, having a common vertical longitudinal axis 68. A flange 69 integral with the cap is connected to the cylinder flange 70 as by means of suitable cap screw connectors 71, and a port 72 in the flange is adapted to admit pressure fluid into the cylinder bore 73. The lower end of the cylinder is provided with a head 74 which also contains a port 75 for transferring pressure fluid into the lower regions of the cylinder. A suitable control valve 210 for controlling fluid pressure flow to the ports 72 and 75 through lines 211 and 212 is shown in FIG. 4.

A recess 76 sunk into the head 74 from the lower side thereof contains a combination radial and thrust bearing 77, the inner race of which supports the annular shoulder 78 of rotary shaft means generally designated at 79, these elements being better shown in FIG. 1a. The bearing is retained in the recess between a flange 279 integral with the head 74, and a boss 80 integral with a spacer 81 which is connected to the underside of the head 74 as by suitable connector cap screws 82. The flange 279 and boss 80 bear against the bearing outer race, whereas the bearing inner race is clamped between a spacer 83 and a part 84 which is held against the inner race by a clamp nut 85. The latter is screwed on the threads 86 on the rotary shaft means and freely rotates within a recess 87 in the spacer 81.

An adapter 88 is connected against the underside of the spacer 81 as by suitable cap screws 89, its function being to provide means for mounting the operator upon a valve. A coupling 90 secured to the rotary shaft means by a suitable set screw 92 and key 93 serving to interconnect the shaft and the drive stem of a valve. The coupling 90 has legs 94 fitting downwardly into slots 95 in a rotary part 96 which is keyed at 97 to a drive stem 98 for rotating the latter and a gear 99 attached thereto. Accordingly, rotation is transmitted from the rotary shaft means 79 to gear 99 as better shown in FIG. 4.

It will be understood from reference to FIG. 4 that rotation of the gear 99 is transmitted to a larger spur gear 100, from which rotation is transmitted to a valve stopper 101 received within a valve chamber 102. A stem 103 for the ball type stopper transmits rotation to the latter from the gear 100, and it will be understood that the stopper is to be rotated approximately one-quarter turn between open and closed positions corresponding to terminal rotary output positions of the rotary shaft means 79. In the former or stopper open configuration a passage through the stopper is in registration with ports in the valve body portions 104 and 105, whereas in the latter configuration the passage, not shown, extends approximately perpendicular to the axis of stem 103 and to the axis 106 of the said flow ports in the valve body. While a specific valve has been discussed and described, it will be understood that the valve operator has utility in combination with different types of valves to which rotary motion is transferable for actuating the valve between open and closed positions. This is true not only of the operator shown in FIGS. 1 and 2, but also with respect to the other operators shown in the drawings.

Referring back to FIGS. 1 and 1a, what may be characterized as driver means is shown generally at 107 within the chamber 65, and specifically in the form of a driver sleeve extending coaxially with respect to the rotary shaft means 79. The sleeve is reciprocable within the chamber 65 between an upper position wherein the major extent of the sleeve extends within the cap 67, and a lower position as shown, wherein the major extent of the sleeve extends within the cylinder 66, encircling the rotary shaft means 79. The sleeve and the shaft means have a first set of coupling shoulders which are helical about the axis 68, and specifically the shoulders on the shaft means are shown in the form of external splines 108, while the shoulders on the driver sleeve comprise internal splines 109 at the lower bore region of the sleeve. In this example, the coupling shoulders extend at a common helical angle substantially greater than 12°, and specifically about 45°, so that they are not self-locking against reverse rotation transmitted from the rotary shaft means to the driver means. However, fluid pressure admitted through port 72 into the cylinder and exerted downwardly against a piston 110 integral with the driver sleeve may be used to prevent upward displacement of the latter, thereby preventing inadvertent reverse rotation of the rotary shaft means. In this connection, it will be understood that downward longitudinal displacemnt of the driver sleeve with respect to the rotary shaft means rotates the latter in the direction of the arrow 111 in FIG. 1a, which is clockwise in plan view. Means for sealing off direct communication between the upper pressure responsive annular face of piston 110 and the shaft and torque means splining during relative longitudinal displacement of the driver includes an annular seal 300, typically carried by flange 69 and engaging the reduced or stepped outer surface of the driver sleeve 107.

While the sleeve is thus downwardly displaced relative to the shaft means and the cylinder, it is also turned clockwise to increase the turning effect transmitted to the rotary shaft means by the torque means generally indicated at 112. In this embodiment, the torque means comprises a longitudinally extending shaft which is coaxial with the driver sleeve and these elements are provided with a second set of coupling shoulders which are helical about the axis as illustrated. Specifically, the shoulders on the torque means 112 are formed by external splines 113, whereas the shoulders on the driver sleeve are provided by internal splines 114, the helix angularities of which are greater than 12° and specifically are the same as the helix angularities of the first set of splines discussed above. It is to be noted that the external splines 108 do not have a sealing fit with internal splines 109 and external splines 113 do not have a sealing fit with internal splines 114 so that fluid displaced during reciprocation of driver stem 107 passes freely through the open bore of the driver from one end to the other. Accordingly, there is a flow passage formed between the interior periphery of the driver 107 and the external splines 108 and 113, said flow passage interconnecting opposite ends of the driver to pass a portion of the actuating fluid in lubricating proximity with the external and internal splines 108, 113, 109 and 114 when the driver is reciprocated. Further, the chamber directly below the driver head or piston 110 is seen to be in direct communication with the external splines 108 and 113 to receive lubricating fluid exhausted from the space defined by the torque means splines 113 and the cylindrical bore portion formed by the cap 67 as the driver moves upwardly to expand said chamber. Fluid seals are shown at 233 and 234, the former for sealing off between the torque means 112 and housing plate 121, and the latter for sealing off between the shaft means 79 and the housing spacer 81.

The upper extent of the torque means 112 comprises a shaft extension having an annular shoulder 115 supported for rotation by bearing 116 which is received within a recess 117 in a cap head 118. The outer race of the bearing is held between a flange 119 on the head 118 and a boss 120 integral with a spacer plate 121 on top of the head 118. The inner race of the bearing 116 is held between a spacer 122 on the torque means and a clamping part 123 clamped by a nut 124 screwed on the threads 125 on the torque means extension.

The other means mentioned in the introduction for effecting the desired relative displacement, with consequent turning of the rotary shaft means, may also be considered to include auxiliary mechanism comprising a handwheel 126 above the spacer plate 121 connected with the torque means extension 127 as by a suitable set screw 128. Also, the handwheel hub 129 may be connected to the spacer plate 121 as by a connector bolt 130 receivable within a recess 131 in the plate 121. Such interconnections prevent turning of the torque means 112 about the axis 68, such as during upward and downward displacement of the driver means 107 in response to fluid pressure actuation thereof. For this purpose, fluid enters through the port 72 to drive the piston 110 and the driver means downwardly, and fluid pressure entering through port 75 and exerted upwardly against the piston 110 drives the latter and the driver means 107 upwardly. In the event manual operation of the valve is desired, regardless of whether or not fluid pressure is being applied to the ports 72 or 75, the torque means 112 may be rotated to turn the rotary shaft means and the valve stopper by actuation of a turning means or handwheel 126. For this purpose, the bolt 130 may be retracted upwardly from the recess 131 as by turning of the bolt handle 132, thereby to free the handwheel for turning the torque means 112, which function serves to turn the driver means 107 and rotary means 79. In the event the driver means is held in a fixed endwise position within chamber 65 by fluid pressure application through port 72 or port 75, handwheel rotation will cause immediate rotation of driver means 107 and rotary means 79. However, if driver means 107 is free to move endwise in chamber 65, it will first be raised or lowered to the extreme limits of its stroke before rotary means 79 is rotated.

The final form of operator construction is shown in FIG. 3 to comprise a chamber 171 that includes a lower cylinder 172 of enlarged diameter and an upper cap 173 of reduced diameter, these elements being held in coaxial longitudinal alignment by suitable cap screws 174 interconnecting a cap flange 175 and a cylinder flange 176 as illustrated. A cylinder head 177 at the lower end thereof is upwardly recessed at 178 to receive a bearing 179, the inner race of which supports the annular shoulder 180 of the rotary shaft means 181 for rotation in coaxial relation with the chamber. Such rotation is transmitted to exterior equipment through a lower extension 182 of the rotary shaft means, the extension projecting below a bottom retainer plate 183 for the bearing 179.

Received within the chamber 171 for longitudinal and coaxial reciprocation therein is a driver sleeve 184 having an integral lower end flange 185 which is connected to an actuator piston 186, cap screws 187 being provided for this purpose. The driver sleeve and piston are, accordingly, integrally interconnected, and the piston and rotary shaft means have a first set of coupling shoulders which are helical about the axis 190. These shoulders are provided by external splines 191 on the rotary shaft means, and internal splines 192 on the piston 186, the helix angularity of the splines being less than 12° so that again the first set of coupling shoulders is self-locking against rotation of the rotary shaft means relative to the sleeve 184 in the absence of longitudinal displacement of the sleeve relative to the rotary means.

In this embodiment the torque means is shown at 193, the driver sleeve and torque means having a second set of coupling shoulders which include external splines 194 on the torque means and internal splines 195 on the driver, splines 195 having reduced axial extent and being confined to the uppermost extent of the sleeve. As is clear from FIG. 3, the splines 193 and 195 have helix angularity the same as that of the splines 191 and 192, and the arrangement is such as to turn the driver sleeve in a direction which adds to the turning effect transmitted to the rotary shaft means, all in response to longitudinal displacement of the driver sleeve.

Such displacement is effected by fluid pressure communication through ports 196 and 197 respectively communicating with the upper and lower faces of the piston 186, so that fluid pressure communication through port 196 drives the piston and the driver means downwardly, whereas fluid pressure communication through port 197 urges the piston and the driver means upwardly. Fluid displaced during reciprocation of driver stem or sleeve 184 passes through the open bore of the driver from one end to the other as was described in connection with FIGS. 1 and 1a. During such piston displacement, the torque means 193 is normally not rotating about the longitudinal assembly axis 190. The reason for self-locking of the torque means against rotation is found in the provision of means for holding the torque means against such rotation, such as is provided by the threaded interengagement of a worm 198 on shaft 199 and teeth 200 of a turning means or ring gear 201 keyed at 202 to the sleeve extent 203 of the torque means. In other words the torque means can only be rotated in response to turning of shaft 199 as by means of the handwheel 204, in the absence of which the worm and ring gear are locked up to hold the torque means against rotation. On the other hand, this arrangement provides the additional advantage that the rotary shaft means 181 may be directly rotated in response to turning of the handwheel 204 due to self-locking characteristics of the assembly including the torque means 193, the driver sleeve means 184 and the rotary shaft means 181, resulting from the self-locking helix angularity of the associated splines. Therefore, regardless of the direction or magnitude of fluid pressure being applied to piston 186 the rotary equipment coupled to the lower extension 182 of the rotary shaft means may be turned by or in response to rotation of the handwheel 204.

Means for sealing off direct communication between the upper pressure responsive annular face of piston 186 and the shaft and torque means splining during relative longitudinal displacement of the driver includes an annular seal 310, typically carried by cap 173 and engaging the reduced or stepped outer surface of the driver sleeve 184.

I claim:

1. A rotary operator assembly comprising a housing having stepped cylindrical bore portions extending coaxially longitudinally, fluid pressure responsive and axially reciprocable driver means having externally stepped cylindrical sealing surfaces, said surfaces respectively received by and having slidable sealing relationship with said bore portions, said driver means being generally tubular and having a bore and longitudinally spaced sets of internal splines, rotary shaft means journaled for rotation within the housing and having external splines engaging one set of said internal splines, and torque means carried by said housing, a fluid seal between said torque means and said housing, said torque means extending within said driver means and having external splines engaging another set of said driver internal splines, means for locking said torque means against rotation so that axial reciprocation of said driver means will result in rotation of said shaft means, said housing and driver forming a pair of chambers alternately to receive actuating fluid pressure at opposite sides of said head section, one of said chambers being in direct communication with the external splines of both said shaft means and torque means through the bore of said driver means whereby the splines of said torque and shaft means are lubricated by pressure fluid received by said one chamber.

2. A rotary operator assembly comprising a housing having stepped cylindrical bore portions extending coaxially longitudinally, fluid pressure responsive and axially reciprocable driver means having externally stepped cylindrical head and stem sections, said sections respectively received by and having slidable sealing relationship with said bore portions, said driver means being generally tubular and having longitudinally spaced sets of internal splines, rotary shaft means journaled for rotation within the housing and having external splines engaging one set of said internal splines, and torque means carried by said housing, a fluid seal between said torque means and said housing, said torque means extending within said driver means and having external splines engaging another set of said driver internal splines, means for locking said torque means against rotation so that axial reciprocation of said driver means will result in rotation of said shaft means, said housing and driver forming a pair of chambers alternately to receive actuating fluid pressure at opposite sides of said head section, one of said chambers being in direct communication with the external splines of said shaft means and torque means to receive lubricating fluid exhausted from a space defined by the torque means splines and one of the cylindrical bore portions as the driver means moves to expand said one chamber, said locking means being releasable, and including turning means for rotating said torque means, driver means and shaft means as a unit when the driver means is held in a longitudinally fixed position within the housing.

References Cited by the Examiner

UNITED STATES PATENTS 3,036,473   5/62   Geyer _____ 74—89

DON A. WAITE, *Primary Examiner.*